US 8,086,849 B2

(12) United States Patent
Kaler et al.

(10) Patent No.: US 8,086,849 B2
(45) Date of Patent: Dec. 27, 2011

(54) SECURE INTERNET-SCALE EVENTING

(75) Inventors: Christopher G. Kaler, Sammamish, WA (US); John P. Shewchuk, Redmond, WA (US); Giovanni Moises Della-Libera, Seattle, WA (US); Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1413 days.

(21) Appl. No.: 10/210,067

(22) Filed: Aug. 2, 2002

(65) Prior Publication Data

US 2004/0025014 A1     Feb. 5, 2004

(51) Int. Cl.
*H04L 9/00* (2006.01)
(52) U.S. Cl. ........ 713/163; 713/150; 713/168; 713/170; 713/171; 726/2; 380/277; 380/279; 380/282
(58) Field of Classification Search ................ 713/1, 2, 713/188, 194; 380/200, 201, 255, 277; 176/2; 726/2, 33
See application file for complete search history.

(56) References Cited

U.S. PATENT DOCUMENTS

| 6,212,280 | B1 * | 4/2001 | Howard et al. | 380/279 |
| 6,215,877 | B1 * | 4/2001 | Matsumoto | 380/277 |
| 7,085,839 | B1 * | 8/2006 | Baugher et al. | 709/229 |
| 7,096,355 | B1 * | 8/2006 | Marvit et al. | 713/162 |
| 7,266,681 | B1 * | 9/2007 | Janes | 713/151 |

* cited by examiner

*Primary Examiner* — Saleh Najjar
*Assistant Examiner* — Joseph Pan
(74) *Attorney, Agent, or Firm* — Workman Nydegger

(57) ABSTRACT

A method and system are provided for delivering event messages in a secure scalable manner. A network includes an event distribution device serving as an event generation device for generating and disseminating an event message through the network to event distribution devices serving as edge event delivery devices having recipient devices connected thereto. Event messages may be encrypted at the event generation device for each of the destination recipient devices or event messages may be encrypted at each of the edge event delivery devices for delivery to respective recipient devices connected thereto. A signing key may also be included with the encrypted message such that the respective recipient devices may authenticate a sender of the encrypted message based on the signing key. Encryption keys may be established based on policies of the network of event distribution devices or based on policies of the respective recipient devices.

33 Claims, 9 Drawing Sheets $\{[M]_{M1} [\text{Key Broker Address}]\} \text{Sig(BA)}$

SECURE INTERNET-SCALE EVENTING

FIELD OF THE INVENTION

The present invention relates to an improved method and system for sending events in a secure manner via a network.

BACKGROUND OF THE INVENTION

A group of users may subscribe to a service that provides, for example, stock price updates for particular stocks, breaking news stories, etc. When, for example, the stock price for one of the stocks changes, an event may be generated such that a message that includes the updated stock price is sent to those subscribers or recipients who have expressed a desire to receive information regarding the stock. It is sometimes desirable to send events in a secure manner for a number of reasons including, but not limited to, confidentiality as well as preventing non-paying users from receiving information without paying a subscription fee.

In one prior art method of generating and securely sending an event message to a plurality of recipient devices via a network, the event is generally encrypted with a key known to each recipient device and then sent to the recipient device via the network. This may be accomplished by, for example, encrypting the event message with a key known to recipient device 1 and sending the encrypted event message to recipient device 1, encrypting the event message with a key known to recipient device 2 and sending the encrypted event to recipient device 2, and so on. Such a method of sending secure events to multiple recipient devices is secure and works well when the number of recipients is small; however, as the number of recipients becomes large, a large amount of time and resources are required to encrypt the event for each particular recipient device prior to sending the event.

In another prior art method for sending secure event messages to multiple recipient devices, an event message may be encrypted using a predetermined single key known to all recipient devices. Thus, the event may only be encrypted once using a single key; however, such a system is not very secure. For example, if the key is obtained by an unauthorized party, that party may then be able to decrypt all transmitted events encrypted with the same key. Further, when the key changes, the new key may require distribution to all recipient devices, whether or not the recipient devices will receive events using that key. When the number of recipients is large, resources and time may be expended distributing a key that may not be used.

Thus, a secure scalable method for sending an event message that works well for systems having a small or large number of recipients is needed.

BRIEF SUMMARY OF THE INVENTION

The present invention addresses the above-mentioned problems by providing a network of event distribution devices. The network includes an event distribution device serving as an event generation device for generating and disseminating an event message through the network to event distribution devices serving as edge event delivery devices having recipient devices connected thereto. Event messages may be encrypted at the event generation device for each of the destination recipient devices or event messages may be encrypted at each of the edge event delivery devices for delivery to respective recipient devices connected thereto. A signing key may also be included with the encrypted message such that the respective recipient devices may authenticate a sender of the encrypted message based on the signing key. Encryption keys may be established based on policies of the network of event distribution devices or based on policies of the respective recipient devices.

In an embodiment of the invention, a system is provided that includes one or more key brokers within the network of event distribution devices. One of the key broker(s) may provide a message key and a signing key to an event distribution device for encrypting an event message. A recipient device that receives an encrypted event message may request a reading key and a signing key from one of the key broker(s) in order to decrypt the encrypted event message and authenticate a source of the event message.

In another embodiment of the invention, a plurality of event distribution devices are included in a network. The network may be a secure network or may be a private trusted network that does not require the event messages to be encrypted within the network. If encryption is performed, the encryption may be internal to the network and event distribution devices that serve as edge event delivery devices may deliver the event messages to recipient devices unencrypted. Alternatively, the edge event delivery devices may encrypt the event messages for each recipient device.

BRIEF DESCRIPTION OF THE DRAWINGS

The present invention is described with respect to the accompanying figures, in which like reference numerals identify like elements, and in which:

FIG. 4 illustrates an encrypted message and a key broker address for delivery to a recipient device in an embodiment of the invention;

DETAILED DESCRIPTION

Operating Environment

Aspects of the present invention are suitable for use in a variety of networked computing system environments. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include handheld devices, multiprocessor systems, microprocessor-based or programmable consumer electronics, network PCS, minicomputers, mainframe computers, and the like.

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available hardware storage media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other storage medium which can be used to store the desired executable instructions and which can be accessed by a general purpose or special purpose computer. A computer readable or machine readable data storage device shall be construed to be a physical hardware device capable of storing data and/or executable instructions and shall be construed to exclude signals. Combinations of the above should also be included within the scope of computer readable media. Executable instructions comprise, for example, instructions and data which cause a general purpose computer, special purpose computer, or special purpose processing device to perform a certain function or group of functions.

Figure 1:
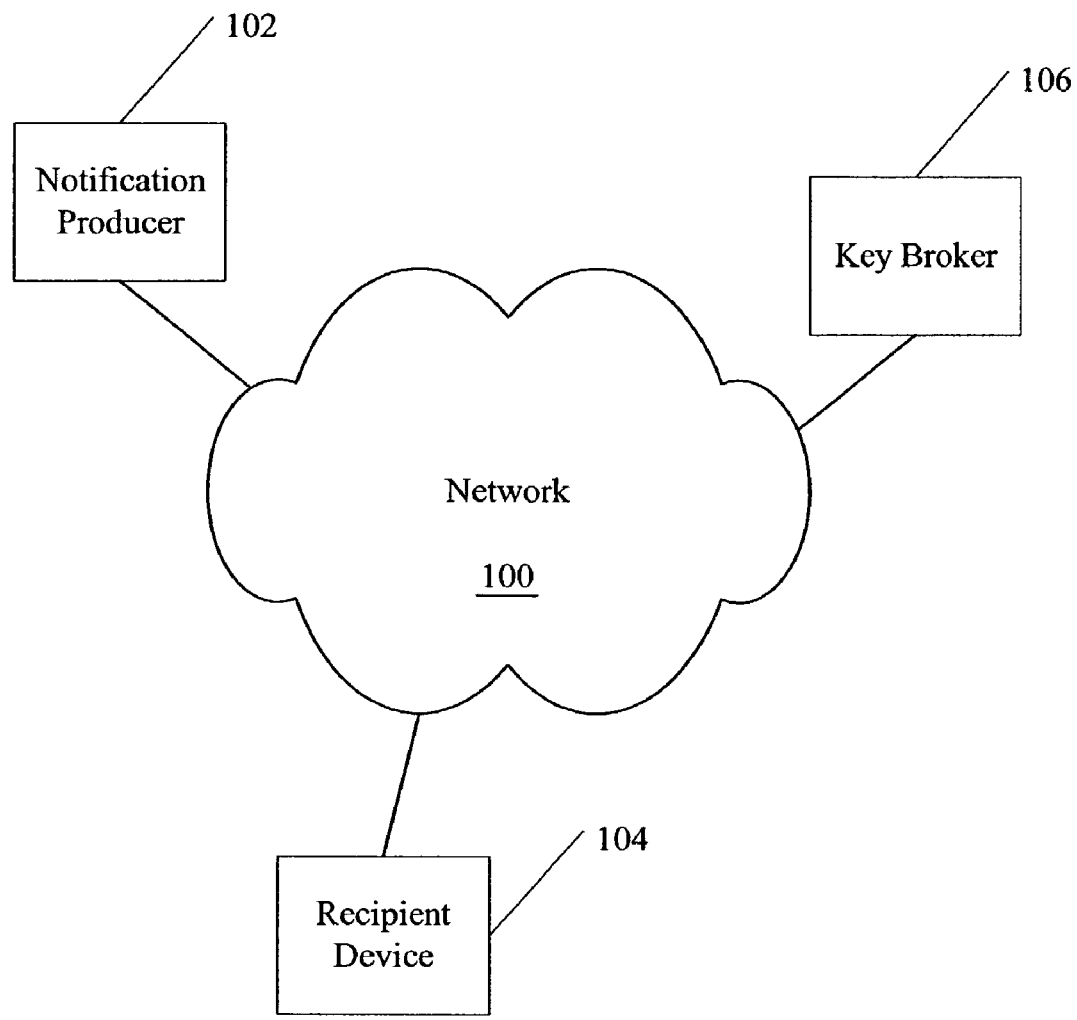
FIG. 1 shows an exemplary operating environment of the invention.

FIG. 1 illustrates an exemplary operating environment in which an embodiment of the invention may be implemented. A network 100 or a plurality of networks may connect notification producer 102, recipient device 104 and key broker 106. The network may include a plurality of event distribution devices connected therein. Further, the network may be one or more networks connected together, such as the Internet, or may be a private and secure network having a plurality of networked event distribution devices therein, or may be a combination of each. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as Microsoft7 Network. Systems may also include more than one communication network, such as a LAN coupled to the Internet.

Each of notification producer 102, recipient device 104, key broker 106, and event distribution devices may be a computer device, as described above. Furthermore, although FIG. 1 illustrates each of notification producer 102, recipient device 104, and key broker 106 as single, separate devices, the functionality provided by each may be implemented in fewer or more devices. Similarly, although the functionality provided by notification producer 102, recipient device 104 and key broker 106 is illustrated as being implemented on separate devices, such functionality may be combined in various ways between them with either a greater or lesser number of total parts. Illustrating the various parts as separate and as a single device is done for clarity of explanation and is not meant to limit the invention to such embodiments.

DESCRIPTION OF EMBODIMENTS

Figure 2:
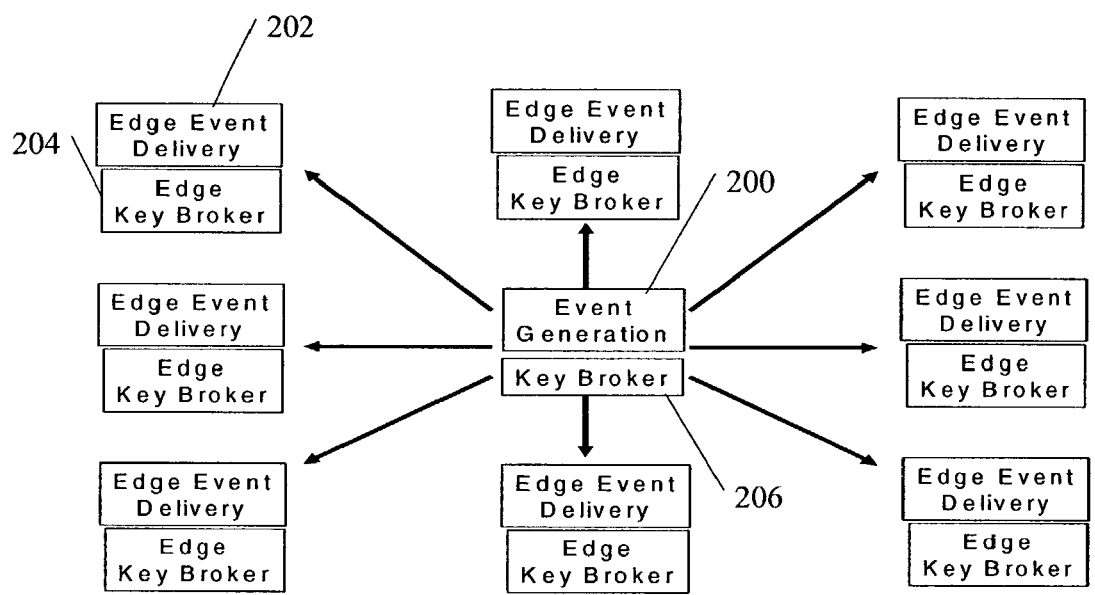
FIG. 2 illustrates an exemplary network of event distribution devices for use in an embodiment of the invention.

FIG. 2 illustrates an exemplary embodiment of event distribution devices communicating within a network, such as network 100. Event distribution devices may be either an event generation device 200 for generating an event message or an edge event delivery device 202 for delivering event messages to one or more recipient devices connected to the edge event delivery device 202. The network may be a private and secure network, a plurality of networks, such as the Internet or a combination of networks such as a combination of the Internet and private networks. Notification producer 102 determines that an event is to be generated and sends a notification to event generation device 200 to generate and disseminate an event message. The notification may be a code, indicating a type of event to generate, and may include corresponding data to be disseminated. The notification may also include an indication of a group of subscribers, or recipient devices, that are to receive an event message corresponding to the event notification.

Event generation device 200 receives the notification from notification producer 102 indicating that the event is to be disseminated. Prior to disseminating the event message, event generation device 200 may request a message key from key broker 206, encrypt the event message using the message key and deliver the encrypted message to edge event delivery devices 202. In some implementations the key broker may physically be included in the edge event delivery devices 202 and/or the event generation devices 206. Each of the receiving edge event delivery devices may deliver the encrypted event message to one or more recipient devices communicating with the edge event delivery device Each of the receiving recipient devices may determine whether it already has possession of a reading key corresponding to the message key used to encrypt the message, such that the recipient device may then decrypt the event message. If any of the recipient devices does not have possession of a valid reading key, the respective recipient device may request the key from an edge key broker. That is, in this illustrative embodiment of the invention, edge key broker 204 maintains the key for each of the recipient devices communicating with a particular edge event delivery device 202.

In an alternative embodiment, only a single key broker may be used within the network of event distribution devices. In such an embodiment, the event generation device 200 requests a message key from the single key broker, encrypts the event message and disseminates the message to the appropriate edge event delivery devices 204. The edge event delivery devices 204 deliver the encrypted event message to connected recipient devices. If the connected respective recipient device does not already have a reading key for decrypting the event message, each respective recipient device requests the reading key from the single key broker.

Other alternative embodiments that include a plurality of key brokers may be arranged such that some key brokers may be associated with a plurality of edge event delivery devices while other key brokers may be associated with only one edge event delivery device.

In yet another alternative embodiment, notification producer 102 may send an encrypted notification (using a key, which is different from a message key) or may send an unencrypted event notification to an event distribution device, which distributes a corresponding event message to appropriate edge event delivery devices. The message may or may not be encrypted for internal dissemination within the network of event distribution devices. Each respective edge event delivery device may deliver the event message to recipient devices encrypted or unencrypted. If the edge event delivery device is to encrypt the message, the key used to encrypt the event message for each recipient device may be a key negotiated by the recipient device with a key broker (either an edge key broker or a central key broker) according to security policies of the recipient device. Thus, the event delivery device may request a message key (to encrypt the message for delivery to a recipient device) from the key broker when the event delivery device determines that it does not have a valid message key for encrypting the message for a respective recipient device. The recipient device requests a reading key (for decrypting a received message encrypted using the message key) from the key broker when it determines that it no longer has a valid reading key. A time period may be associated with the keys, such that the keys are valid only during the time period. When the keys are valid for a specific time period, the key broker may provide an indication of the time period. Further, the alternative embodiment may support key retention policies of the recipient devices.

Figure 3:
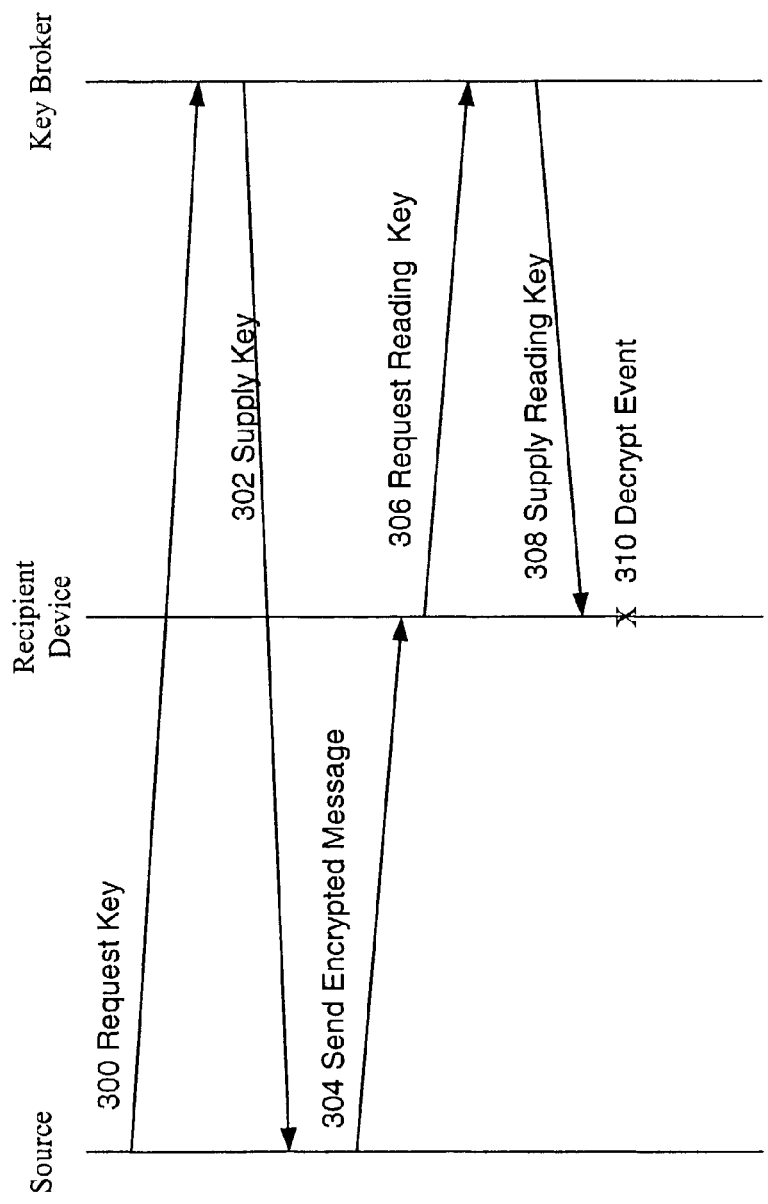
FIG. 3 shows interactions between an event distribution device, a key broker, and a recipient device in an exemplary embodiment of the invention.

With reference to FIG. 3, operation of an embodiment of the invention is explained. At 300, an event generation device is preparing to disseminate an event message and requests a message key and signing key from a key broker.

At 302, the key broker supplies the message key and signing key to the event generation device.

At 304, the event generation device encrypts the message using the message key, signs the message using the signing key and may send the message to one or more edge event delivery devices that are connected to one or more recipient devices. Further, the event generation device may also have recipient devices connected thereto.

After the encrypted message is delivered to the respective recipient devices, at 306, each respective recipient device requests a reading key and a signing key from the key broker, if they do not already have the keys.

The key broker determines whether each of the respective recipient devices is authorized to read the respective encrypted message and if so, supplies the reading key and signing key to the recipient device. At 310, upon receiving the keys, each of the respective recipient devices decrypts the event message and may determine the source of the event based on the signing key.

In an embodiment that uses internal encryption keys for encrypting event messages within the network or which does not encrypt event messages when sending the messages within the network, edge event delivery devices may request and receive message and signing keys from a key broker, encrypt and sign each event message and deliver the encrypted event messages to each connected recipient device. Further, in an alternate embodiment, event messages may be delivered unencrypted to recipient devices.

In embodiments of the invention, an address of a key broker may be included with an encrypted event message when the encrypted event message is delivered to a respective recipient device. In an embodiment using only a single key broker, the address of that single key broker may be included. In an embodiment having multiple key brokers, such as the embodiment shown in FIG. 2, an edge event delivery device may include, with the encrypted event message, an address of a key broker associated with the edge event delivery device. Such an approach may help recipient devices locate a key broker where keys can be obtained.

Figure 4:
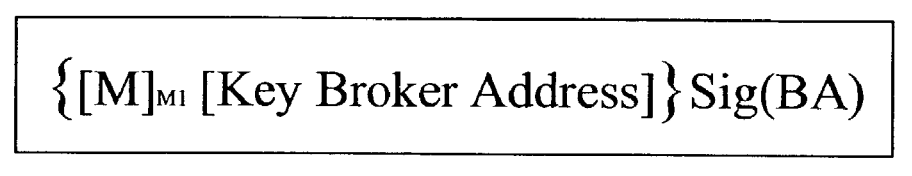

FIG. 4 shows an example of a message including an encrypted message, encrypted with message key M1, and an address of a key broker. The message may also be signed by an authority (in this example an authority called BA signed the message). As shown in FIG. 4, the message and the key broker address may be signed thereby binding the message and broker address together. Upon receipt of this message, the recipient device may request a reading key and signing key from the key broker located at the address included in the received message.

Figure 5:
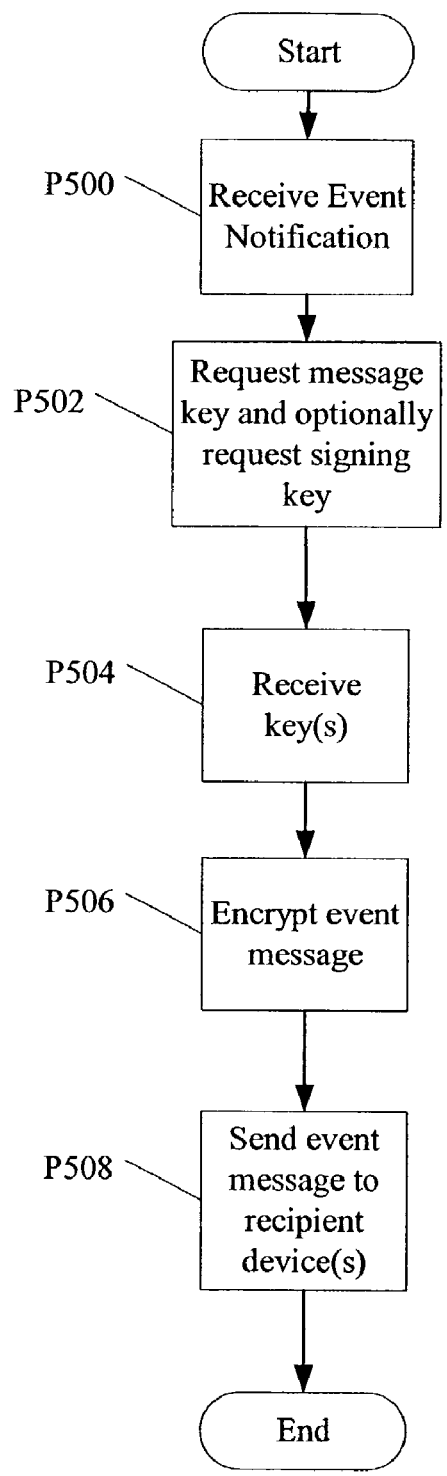
FIG. 5 is a flowchart for explaining processing within an event distribution device having encryption capability in an exemplary embodiment of the invention.

With reference to FIG. 5, operation of an exemplary event generation device is explained. At P500, an event notification is received. The event notification may include an indication of recipient devices to receive a corresponding event. The indication may include, but not be limited to, a list of addresses of each of the recipient devices or may be a name of a group of recipient devices. Alternatively, the list of recipients can be obtained in a different way. For example, the source of the event notification can prearrange with the event generation device the list of recipients. Alternatively, the event generation device may have access to an "address book" of distribution lists or recipients and the source of the event notification can identify which entry(s) in the "book" should be used. In other embodiments, the event generation device may be able to identify the intended recipient(s) from the context or content of the event notification. Other ways may also be possible.

At P502, the event generation device requests a message key from a key broker if the event generation device does not currently have a valid message key. The key broker may be a key broker central to the system or may be a key broker associated with the particular event distribution device. The event generation device may optionally request a signing key for signing the event message.

At P504, the key(s) is/are received.

At P506, the event generation device encrypts the message using the received message key and, if a signing key is received, the event distribution device may sign the message using the signing key. In alternative embodiments, the notification producer may sign the message before delivering the message to the event generation device. In such a case, the event generation device may not also sign the message.

At P508, the event generation device then sends the encrypted message to edge event delivery devices for delivery to the recipient devices. Further, the received key(s) may have a specific time period during which the key(s) is/are valid. Thus, the key may be saved and stored in a storage device, including, but not limited to computer memory or a medium, such as a hard disk, floppy disk or optical disk. When the key(s) is stored and valid, the event distribution device may not request the key prior to encrypting and sending an event message.

In an alternative embodiment, the event message may or may not be encrypted for internal dissemination within a network of event distribution devices; however, after delivery of the event message to an edge event delivery device, the edge event delivery device may perform steps P502 through P508. That is, the edge event delivery device may request encryption and signing keys and encrypt and sign the event message prior to sending the event message to respective recipient devices.

Figure 6:
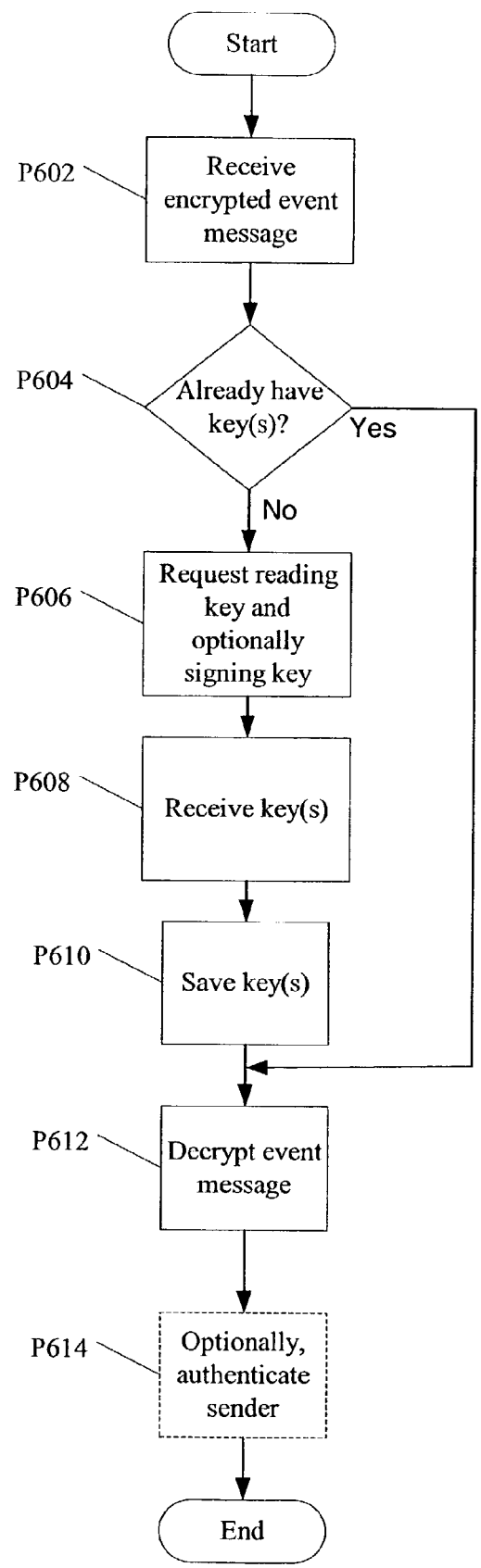
FIG. 6 is a flowchart for explaining processing within a recipient device of an exemplary embodiment of the invention.

With reference to FIG. 6, processing within an embodiment of the recipient device is explained. At P602, the recipient device receives the encrypted event message. Included with the encrypted event message may be an address of a key broker.

At P604, the recipient device determines whether it already has a valid reading key and, optionally, a signing key. If so, processing continues from P612. Otherwise, processing continues from P606.

At P606, the recipient device requests the reading key and optionally, the signing key from a key broker. If an address of a key broker was included with the encrypted event message, then the recipient device requests the reading key and optionally the signing key from that particular key broker. The key broker may be a central key broker, from which all recipient devices and all event distribution devices may request keys, the key broker may be associated with one or more event distribution devices or the key broker may be a key broker associated with one or more recipient devices.

At P608, the reading key and, optionally, the signing key are received. At P710, the keys may be saved in storage, including but not limited to computer memory or a medium such as hard disk, floppy disk or optical disk, such that the keys may be used in the future and a request to a key broker for the keys may be avoided. The keys may be valid for a particular time interval and an indication of such an interval may be stored so that a determination can be made as to whether the stored key(s) is fresh or valid.

At P612, the recipient device decrypts the event message using the reading key. At P614, if a signing key was received, the recipient device may authenticate the received event message to determine a source of the event.

In another embodiment of the invention, the notification producer may send, encrypted or unencrypted, a notification, indicating an event to an event generation device within a network of event distribution devices. The notification producer may receive a key to encrypt the notification via any means known to one of ordinary skill in the art. Further, the event generation device receiving the notification may request and receive the key for decrypting the notification if the notification is encrypted, via any means known to one of ordinary skill in the art. The event distribution device then may distribute the event message to edge event delivery devices on the edge of the network, which are arranged to communicate with recipient devices. The event messages may be transmitted through the network from one event distribution device to another, unencrypted or encrypted. After the event message reaches an edge event delivery device, the edge event delivery device may request a message key and optionally, a signing key from a key broker. The message key may be unique for each one of the recipient devices. Thus, a plurality of message keys may be received corresponding to each of the plurality of recipient devices connected to the edge event distribution device. The edge event distribution device may then encrypt the event message using the specific message key for a respective one of the recipient devices.

In the embodiment shown in FIG. 3, when a recipient device requests a reading key and/or a signing key, the key broker may determine whether the recipient device is authorized to receive the key(s) based upon an access control list (ACL). Alternatively, the recipient device may present information to the key broker, such as a license or an X.509 certificate, indicating that the recipient device is authorized to receive the key(s).

Figure 7:
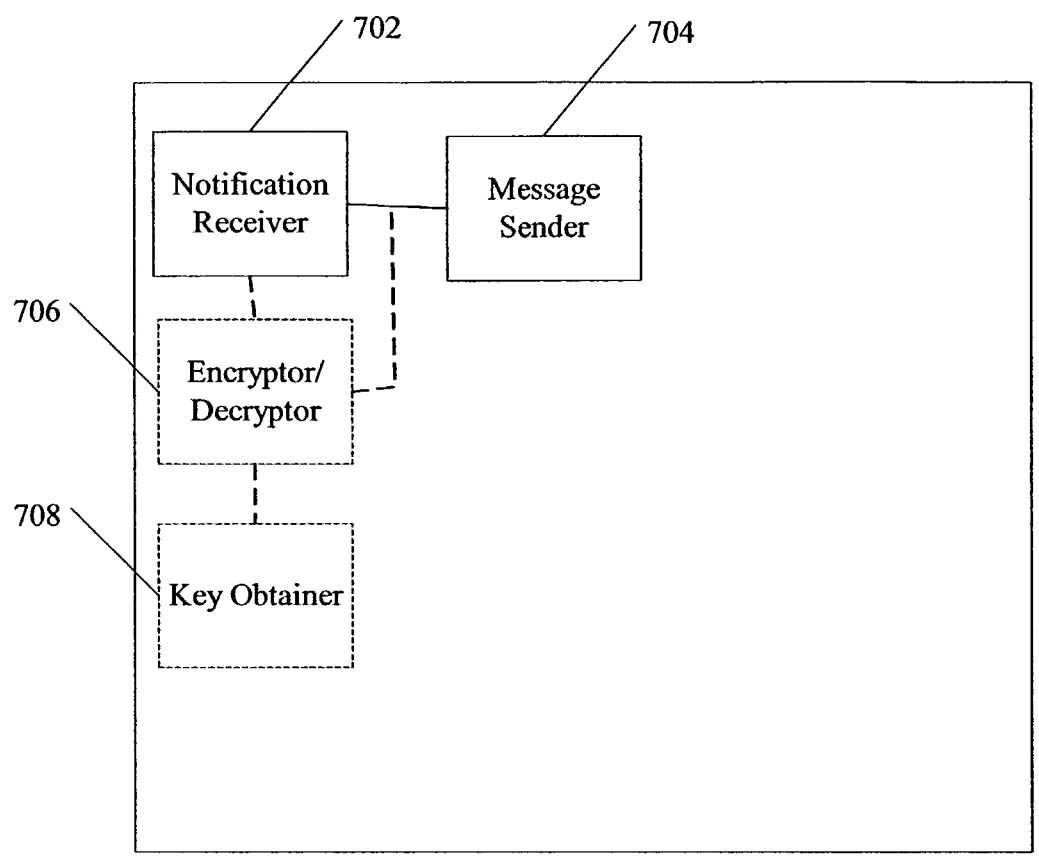
FIG. 7 is a functional block diagram of an exemplary event generation device with an optional encryption and decryption capability.

FIG. 7 illustrates the functions within an exemplary event generation device. The exemplary event distribution device includes a notification receiver 702 for receiving a notification of an event from a notification producer. The notification receiver produces an event corresponding to the notification and optionally, if the event generation device is to encrypt the event message, uses message encrypter/decryptor 706 to encrypt the message and optionally to sign the message, if the event generation device already has a message key and a signing key, or uses key obtainer 708 to obtain a message key and optionally a signing key and provide the key(s) to message encrypter/decryptor 706 for encrypting and optionally, signing the message. The encrypted message is then provided to message sender 704 for sending the message. In an embodiment of the invention, an event generation device may not have a message encrypter and a key obtainer. Further, message encryptor/decryptor may be used to decrypt encrypted event messages.

Figure 8:
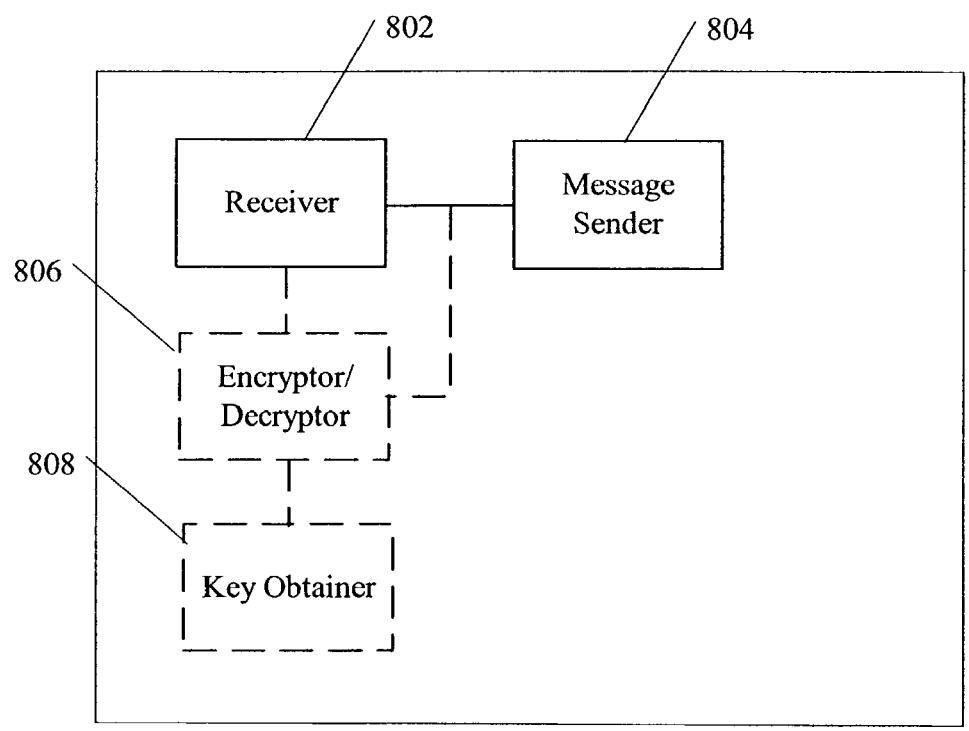
FIG. 8 is a functional block diagram of an exemplary edge event delivery device.

FIG. 8 illustrates the functions within an exemplary edge event delivery device. Receiver 802 receives event messages. Message sender 804 sends messages to connected recipient devices. Optional Encryptor/decryptor 806 decrypts received messages and encrypts messages to be sent to the connected recipient devices. Key obtainer 808 obtains any keys required for encryption or decryption, such as message keys, reading keys, as well as signing keys.

Figure 9:
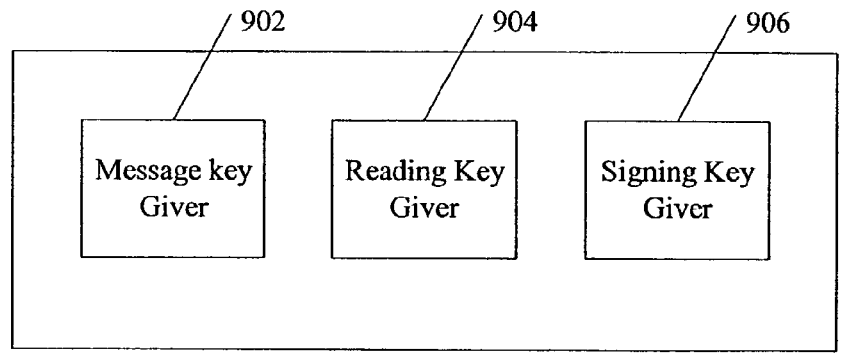
FIG. 9 is a functional block diagram of an exemplary key broker device.

FIG. 9 illustrates the functions within an exemplary key broker in an embodiment of the invention. The key broker includes a message key giver 902 for receiving a request for a message key and providing the message key. The key broker may determine whether the requester of the key is authorized to receive the key based on an ACL or based on information provided with the request, such as a license or an X.509 certificate. Reading key giver 904 receives a request for a reading key and provides the reading key. Signing key giver 906 receives a request for a signing key and provides the signing key.

Further, the key broker may be implemented by a web service.

Figure 10:
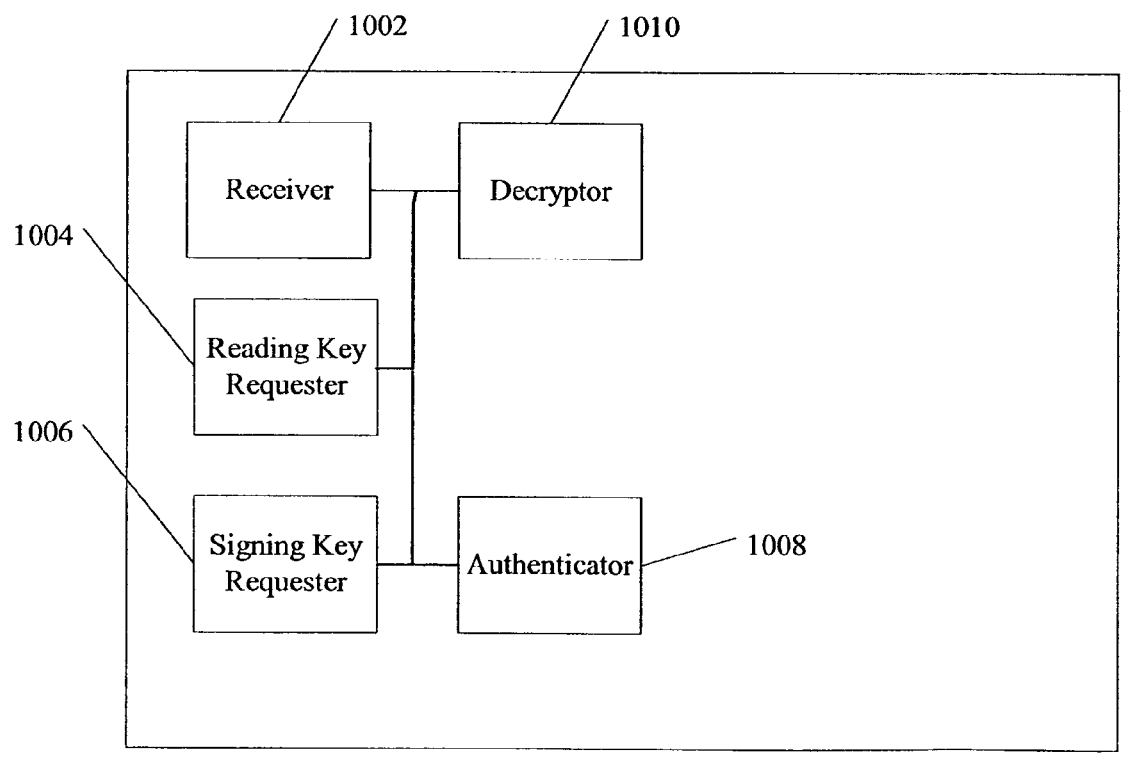
FIG. 10 is a functional block diagram of an exemplary recipient device.

FIG. 10 illustrates the functions provided in an exemplary recipient device. The exemplary recipient device includes a receiver 1002 for receiving event messages. Reading key requester 1004 requests and receives a reading key from a key broker. Signing key requester 1006 requests and receives a signing key from a key broker. Authenticator 1008 authenticates a source of an event message based on the signing key included with the message. Decrypter 1010 decrypts received encrypted event messages using the received reading key.

The above-described embodiments refer to message keys and reading keys. The message keys and reading keys may be any type of encryption key known in the art. As an example, the type of keys may include, but not be limited to symmetric keys, such that the reading key that corresponds to the message key is identical to the message key, asymmetric keys, such that the message key may be a public key, while a corresponding reading key may be a private key with a specific mathematical relationship between the public and corresponding private keys, and elliptical keys.

The functions of the key broker, the event distribution devices (event generation devices and edge event delivery devices), notification producer and recipient devices may be implemented via executable code. Executable code can take many forms. For example, it can take the form of traditional compiled code that is deployed either as system code, is utilized by system code, or executes independently of the system code. Often this type of code is written in a high level language that is then compiled into binary code, either in the form of a library, executable code modules, or executable applications or the like. However, executable code can take other forms as well. For example, the code may be written in a high level language like C#, Java, or the like and then compiled to an intermediate code form, such as Microsoft Intermediate Language (MSIL), Java Bytecodes or another intermediate language representation. This intermediate language representation is then executed in some type of run time environment like the Microsoft NET Framework or a Java Virtual Machine (JVM). Similarly, the code may take the form of script, like ECMAScript, Python, Pearl or the like, which is executed by a script engine.

Further, embodiments of the invention may be implemented in hardware, software, firmware or by an application specific integrated circuit (ASIC). The firmware may be in a read only memory and the software may reside on a medium, such as read only memory, random access memory, floppy disk or compact disk.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A method for disseminating an event message throughout an event distribution network having a plurality of event distribution devices, the method comprising:
a notification producer producing an encrypted notification of an event message for one or more recipient devices and sending the notification to an event distribution device, wherein the notification includes a code indicating the type of event message to generate and corresponding data to be disseminated and further includes an indication of a group of subscribers and/or recipient devices that are to receive the event message corresponding to the encrypted event notification, wherein the encrypted notification is encrypted with a separate notification message key that is only used to encrypt the event notification and is different than any event message keys used to encrypt event messages, and wherein a different event message key is used to encrypt each event message for each subscriber and/or recipient device;
receiving the encrypted notification in said event distribution device by an event generation device, said event generation device being connected to a plurality of delivery devices, said event generation device determining which of said plurality of delivery devices is to receive the event message, each delivery device connected to specific recipient devices and includes a key broker, said event generation device obtaining a message key from a key broker of one of said delivery devices to which the event generation device has determined is associated with the specified recipient device;
encrypting the event message with said message key to produce an encrypted event message in accordance with said encrypted notification;
sending the encrypted event message and an address of a key broker, from the event generation device to said specified recipient devices via said corresponding delivery devices connected thereto, wherein the delivery device receives the event message and forwards the event message to each of the specified recipient devices from amongst the plurality of recipient devices to which the delivery device is associated, such that the recipient devices use the address to contact the key broker for a key to decrypt the encrypted event message.

2. The method of claim 1, wherein the event message is encrypted within the event distribution network and one of the event distribution devices decrypts the event message before sending the event message to the recipient devices connected thereto.

3. The method of claim 1, further comprising using a signing key to sign the encrypted message.

4. The method of claim 1, further comprising using a plurality of message keys to encrypt the event message to produce a plurality of encrypted messages, each of the plurality of encrypted messages to be sent to a respective recipient device connected to the event distribution device, each of the respective recipient devices having a respective reading key for decrypting the received respective one of the encrypted messages.

5. The method of claim 4, wherein each of the respective reading keys is a same key.

6. The method of claim 4, wherein each of the respective reading keys is different from other ones of the reading keys.

7. The method of claim 4, wherein each of the respective encrypted messages is encrypted using a different key.

8. The method of claim 1, further comprising establishing the message key by the recipient device via the key broker.

9. The method of claim 8, further comprising changing the message key according to a policy established at the recipient device.

10. The method of claim 8, further comprising obtaining of the message key by an event distribution element of the plurality of event distribution elements from one of the first key broker and a second key broker.

11. The method of claim 1, wherein the event message corresponding to a notification is sent unencrypted from one event distribution element to another event distribution element within the event distribution network.

12. The method of claim 1, wherein the event message corresponding to a notification is sent from one event distribution element to another event distribution element within the event distribution network encrypted using a key different from the message key.

13. The method of claim 1, further comprising:
receiving of the encrypted message by the one of the recipient devices connected to the event distribution network;
determining, by the one of the recipient devices, whether the one of the recipient devices has a reading key to decrypt the event message;
when the one of the recipient devices does not have the reading key to decrypt the encrypted message, the respective one of the recipient devices performs:
sending a request to a first one of the broker(s) for the reading key;
determining, by the first one of the broker(s), whether the respective one of the recipient devices is authorized to have the reading key; and
in response to the sending of the request for the reading key to the first one of the broker(s), sending, by the first one of the broker(s), the reading key to the one of the recipient devices when the first one of the broker(s) determines that the one of the recipient devices is authorized to have the reading key; and
when the one of the recipient devices has the reading key, using the reading key to decrypt the encrypted message.

14. The method of claim 13, further comprising saving, by the one of the recipient devices, the reading key for future use.

15. The method of claim 13, further comprising requesting, to a second of the broker(s), the message key; and
using the message key to encrypt the event message to produce the encrypted message.

16. The method of claim 15, further comprising:
obtaining, from the second one of the broker(s), a signing key; and using the signing key to sign the encrypted message.

17. The method of claim 13, further comprising:
requesting, by the one of the recipient devices to the first one the broker(s), a signing key; and using the signing key to authenticate a source of the received encrypted message.

18. The method of claim 13, wherein when the first one the broker(s) receives the request for the rending key from the one of the recipient devices, the first one the broker(s) uses an access control list to determine whether the one of the recipient devices is authorized to receive the reading key.

19. The method of claim 13, wherein when the first one the broker(s) receives the request for the reading key from the one of the recipient devices, the request includes information that indicates that the one of the recipient devices is authorized to receive the reading key.

20. The method of claim 13, wherein the reading key is usable only during a specific time period.

21. The method of claim 13, wherein an address of the first one the broker(s) is sent with the encrypted message to the one of the recipient devices, such that the one of the recipient devices uses the address to contact the first one the broker(s).

22. The method claim 13, wherein the at least one broker is a web service.

23. An event distribution device arranged to operate in a network of a plurality of event distribution devices, comprising:
    a receiver for receiving an encrypted notification of an event from a notification producer, wherein the encrypted notification includes a code indicating the type of event message to generate and corresponding data to be disseminated and further includes an indication of a group of subscribers and/or recipient devices that are to receive the event message corresponding to the encrypted event notification, wherein the encrypted notification is encrypted with a separate notification message key that is only used to encrypt the event notification and is different than any event message keys used to encrypt event messages, and wherein a different event message key is used to encrypt each event message for each subscriber and/or recipient device;
    message encryptor/decryptor for encrypting or decrypting the event message; and
    a plurality of delivery devices each having connected thereto one or more specified recipient devices, where each of said plurality of delivery devices is associated with a different one or more specified key brokers from said other plurality of delivery devices each specific key broker containing a key specific for each recipient device to which the delivery device is connected;
    the receiver sending the event message to the appropriate delivery device corresponding to the intended recipient device, the delivery device encrypting the message and including a message sender that sends said encrypted event message and an address of a key broker to which it is associated to said one or more recipient devices connected thereto;
    wherein the address of the key broker is used to obtain at least one key from the key broker for decrypting the message.

24. The event distribution element of claim 23, further comprising a message key obtainer for obtaining the message key from the broker.

25. The event distribution element of claim 23, wherein the message sender is further arranged to send the event message unencrypted.

26. The event distribution element of claim 23, wherein the message sender is further arranged to send the message encrypted with a key different from the message key when the event message is to be sent to another of the event distribution elements within the network.

27. The event distribution element of claim 23, further comprising a key obtainer for requesting and obtaining a signing key for signing the encrypted message.

28. A machine-readable data storage device having instructions stored thereon, such that when the instructions are read and executed by a processor in an event distribution device arranged to operate in a network of a plurality of event distribution devices, the processor is configured to perform:
    a notification producer producing an encrypted notification of an event message for one or more recipient devices and sending the encrypted notification to an event distribution device, wherein the encrypted notification includes a code indicating the type of event message to generate and corresponding data to be disseminated and further includes an indication of a group of subscribers and/or recipient devices that are to receive the event message corresponding to the encrypted event notification, wherein the encrypted notification is encrypted with a separate notification message key that is only used to encrypt the event notification and is different than any event message keys used to encrypt event messages, and wherein a different event message key is used to encrypt each event message for each subscriber and/or recipient device;
    receiving the encrypted notification in said event distribution device by an event generation device, said event generation device being connected to including a plurality of delivery devices, said event generation device determining which of said plurality of delivery devices is to receive an event message, each delivery device connected to specific recipient devices and includes a key broker, said event generation device obtaining a message key from a key broker of one of said delivery devices to which the event generation device has determined is associated with the specified recipient device;
    encrypting an event message with said message key to produce an encrypted event message in accordance with said encrypted notification;
    sending the encrypted event message and an address of a key broker, from the event generation device to said specified recipient devices via said corresponding delivery devices connected thereto, wherein the delivery device receives the event messsage and forwards the event message to each of the specified recipient devices from amongst the plurality of recipient devices to which the delivery device is associated, such that the recipient devices use the address to contact the key broker for a key to decrypt the encrypted event message.

29. The machine-readable data storage device of claim 28, wherein the event message is encrypted within the event distribution network and the processor is arranged to decrypt the event message before sending the event message to the recipient devices connected thereto.

30. The machine-readable data storage device of claim 28, wherein the instructions further cause the processor to be configured to perform obtaining the message key from a broker outside of the network.

31. The machine-readable data storage device of claim 28, wherein the instructions further cause the processor to be configured to perform sending the message unencrypted when the message is to be sent to another of the event distribution devices within the network.

32. The machine-readable data storage device of claim 28, wherein the instructions further cause the processor to be configured to perform sending the message encrypted with a key different from the message key when the message is to be sent to another of the event distribution devices within the network.

33. The machine-readable data storage device of claim 28, wherein the instructions further cause the processor to be configured to perform requesting and obtaining a signing key for signing the encrypted message.

* * * * *

UNITED STATES PATENT AND TRADEMARK OFFICE
CERTIFICATE OF CORRECTION

| | |
|---|---|
| PATENT NO. | : 8,086,849 B2 |
| APPLICATION NO. | : 10/210067 |
| DATED | : December 27, 2011 |
| INVENTOR(S) | : Christopher G. Kaler et al. |

It is certified that error appears in the above-identified patent and that said Letters Patent is hereby corrected as shown below:

IN THE CLAIMS:

In column 12, line 45, in Claim 28, delete "messsage" and insert -- message --, therefor.

Signed and Sealed this
Sixth Day of March, 2012

David J. Kappos
*Director of the United States Patent and Trademark Office*